(12) United States Patent
Bolt et al.

(10) Patent No.: US 7,636,804 B2
(45) Date of Patent: Dec. 22, 2009

(54) DATA STORAGE AND PROTECTION APPARATUS AND METHODS OF DATA STORAGE AND PROTECTION

(75) Inventors: Thomas B. Bolt, San Diego, CA (US); John Edward Maroney, Irvine, CA (US); Edwin Dale Barnes, Lake Forest, CA (US)

(73) Assignee: Quantum Corporation, San Jose, CA (US)

( * ) Notice: Subject to any disclaimer, the term of this patent is extended or adjusted under 35 U.S.C. 154(b) by 243 days.

(21) Appl. No.: 10/834,550

(22) Filed: Apr. 28, 2004

(65) Prior Publication Data

US 2004/0243745 A1 Dec. 2, 2004

Related U.S. Application Data

(60) Provisional application No. 60/466,450, filed on Apr. 28, 2003.

(51) Int. Cl.
*G06F 13/12* (2006.01)
*G06F 13/14* (2006.01)

(52) U.S. Cl. .................. 710/68; 707/101; 710/72; 710/301; 710/305; 714/2; 714/48; 714/746

(58) Field of Classification Search .................. 710/68
See application file for complete search history.

(56) References Cited

U.S. PATENT DOCUMENTS

| | | | | |
|---|---|---|---|---|
| 5,167,034 | A * | 11/1992 | MacLean et al. | 714/52 |
| 5,293,388 | A | 3/1994 | Monroe et al. | |
| 5,684,986 | A * | 11/1997 | Moertl et al. | 707/101 |
| 6,049,848 | A | 4/2000 | Yates et al. | |
| 6,067,587 | A | 5/2000 | Miller et al. | |
| 6,094,532 | A * | 7/2000 | Acton et al. | 712/28 |
| 6,128,698 | A * | 10/2000 | Georgis | 711/111 |
| 6,145,069 | A * | 11/2000 | Dye | 711/170 |
| 6,269,464 | B1 | 7/2001 | Boussina et al. | |
| 6,324,497 | B1 | 11/2001 | Yates et al. | |
| 6,389,503 | B1 * | 5/2002 | Georgis et al. | 711/4 |
| 6,629,062 | B2 * | 9/2003 | Coffey et al. | 702/188 |
| 6,671,832 | B1 * | 12/2003 | Apisdorf | 714/52 |
| 6,819,271 | B2 * | 11/2004 | Geiger et al. | 341/51 |
| 6,883,079 | B1 * | 4/2005 | Priborsky | 711/170 |
| 2002/0003881 | A1 * | 1/2002 | Reitmeier et al. | 380/210 |
| 2002/0105507 | A1 * | 8/2002 | Tranchina et al. | 345/204 |

(Continued)

OTHER PUBLICATIONS

Lamb, S. (Apr. 29, 2003). "Quantum Storage Solutions Group Unveils Disk-Based Enhanced Backup System to Address Enterprise-Class Primary Backup," *Quantum News Release* 4 pages.

*Primary Examiner*—Eron J Sorrell
*Assistant Examiner*—Dean Phan

(57) ABSTRACT

An exemplary storage system for storing data from a host system and emulating a storage tape device is presented. In one example, the storage system includes a compression device configured to associate with a controller of a plurality of storage devices. The compression device is adapted to receive a sequence of data to be stored, divide the sequence of data into two or more blocks, and compress at least two of the two or more blocks in parallel. The system may further create an index associated with the blocks of data to output the data as a continuous stream of data. The compression device may further include dual or multiple ports.

20 Claims, 5 Drawing Sheets

U.S. PATENT DOCUMENTS

| | | | |
|---|---|---|---|
| 2002/0166058 A1* | 11/2002 | Fueki | 713/194 |
| 2003/0007779 A1* | 1/2003 | Miyata et al. | 386/46 |
| 2003/0041162 A1* | 2/2003 | Hochmuth et al. | 709/232 |
| 2003/0086300 A1* | 5/2003 | Noyes et al. | 365/189.01 |
| 2003/0149700 A1 | 8/2003 | Bolt | |
| 2003/0149840 A1 | 8/2003 | Bolt et al. | |
| 2003/0185302 A1* | 10/2003 | Abrams, Jr. | 375/240.12 |
| 2004/0003154 A1* | 1/2004 | Harris et al. | 710/300 |
| 2004/0010660 A1* | 1/2004 | Konshak et al. | 711/114 |
| 2004/0181388 A1* | 9/2004 | Yip et al. | 703/25 |

* cited by examiner

DATA STORAGE AND PROTECTION APPARATUS AND METHODS OF DATA STORAGE AND PROTECTION

CROSS REFERENCE TO RELATED APPLICATION

The present application claims benefit of earlier filed provisional patent application, U.S. application Ser. No. 60/466,450, filed on Apr. 28, 2003, and entitled "MULTI-PORT DATA PROTECTION APPARATUS AND METHODS OF DATA PROTECTION," which is hereby incorporated by reference as if fully set forth herein.

BACKGROUND OF THE INVENTION

1. Field of the Invention

The present invention relates generally to storage devices and methods for storing and retrieving computer data, and more particularly to systems and methods for use in emulated tape drive storage systems.

2. Description of the Related Art

With the increasing popularity of Internet commerce and network centric computing, businesses and other entities are becoming more and more reliant on large amounts of information. Protecting critical data from loss due to systems failures, virus attacks, and the like is therefore of primary importance.

Tape drives have long been a choice for storing archival back-up data in information systems. Historically, many such tape drives have used data compression to maximize the amount of data that can be stored on the tape. Tape, however, is a relatively slow and inefficient storage medium compared to hard drives or disks. Consequently emulated "tape" drives that use arrays of hard drives or disks have become more popular. For example, a hard drive may appear to a host computer or storage system as a storage tape device where data is stored, organized, and retrieved as if the hard drive is a tape storage device. The actual data may be stored in any of a variety of fashions, but will emulate or appear to the host processor and applications running that the data is stored on a physical tape storage device. For instance, the data will be stored and retrieved as a long serial sequence of data from the storage system similar to that of a physical tape storage device.

Emulated tape drive storage systems often rely on software-based data compression techniques to enable the storage of more data. Although, such compression techniques may increase the capacity of the drives and assist in emulating a tape drive capacity, the software compression techniques generally decrease the performance or speed of the input/output (I/O) operations of the storage devices because of the delay caused to serially compress the data. Therefore, software compression techniques are generally utilized, or turned "on" only when emulating tape drives and turned "off" otherwise.

Conventional storage systems that may emulate tape storage systems generally include high-speed servers having a Redundant Array of Independent Discs (RAID). Additionally, such systems may perform data protection features such as Error Correction Codes (ECC) or Cyclic Redundancy Codes (CRCs) through software based solutions. Such software-based systems generally reduce performance and speed as well.

It is desired that emulated storage tape systems have compression comparable to tape drives in order to approximately double (on average) the storage capacity of the systems while also increasing their performance. It is further desired for inexpensive RAID (either ATA or SATA) systems to have higher reliability for use in storage tape systems.

BRIEF SUMMARY OF THE INVENTION

According to one aspect of the present invention an exemplary storage system for storing data from a host system and emulating a storage device is described. The storage system may include a compression device associated with a controller and at least one storage device where the controller is adapted to receive a sequence of data, divide the sequence of data into two or more blocks of data, and compress at least two of the two or more blocks in parallel. The system may further create an index associated with the blocks of data to output the data as a continuous stream of data. The exemplary compression device may provide for fibre channel, Ethernet, iSCSI, and other host bus interfaces as well as hardware data compression, ECC, CRC, and data encryption. In one example, dedicated hardware is included to perform parallel compression of the blocks, and reconfigurable hardware is included to perform various data protection methods, such as error correction methods and the like.

According to another aspect of the present invention an exemplary method for storing data and emulating a storage tape device is described. The method may include receiving a stream of data, dividing the stream of data into two or more blocks, compressing at least two of the two or more blocks in parallel, and indexing the two or more blocks. The compressed data may then be stored in a storage device. The method may further include dedicated hardware to perform parallel compression of the blocks, and various data protection methods, such as error correction methods, using reconfigurable hardware.

The present invention and its various embodiments are better understood upon consideration of the detailed description below in conjunction with the accompanying drawings and claims.

DETAILED DESCRIPTION OF THE INVENTION

Figure 1:
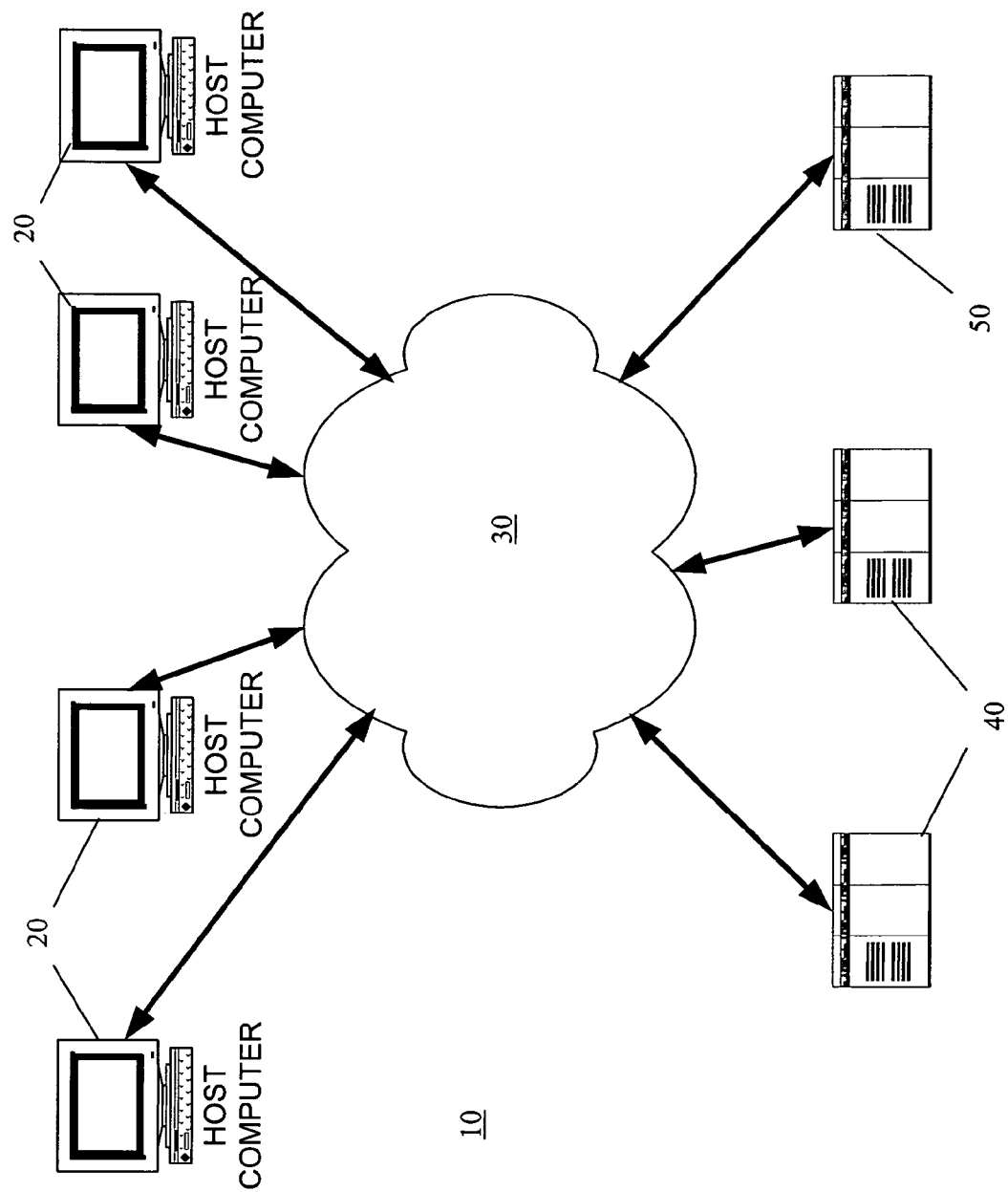
FIG. 1 illustrates a perspective view of an information infrastructure including a data storage system and a host system.

The following description is presented to enable any person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the appended claims.

In the following description, an exemplary compression device is disclosed that provides a hardware compression scheme that may increase the performance and efficiency of a storage system, and specifically, emulated storage tape systems, e.g., magnetic tape libraries or the like. The exemplary compression device includes parallel compression hardware that is configured to compress portions or blocks of the incoming data in parallel before storing the compressed portions of the incoming data. An index associated with the incoming order of the blocks of data is created and output to a main memory as a contiguous stream of compressed data. The exemplary compression device and method may increase the capacity of the storage system as well as increase the speed or throughput of the storage system by compressing the data in parallel. For example, the exemplary compression device may virtually exceed effective bandwidth between a host computer and appliances (and between sub-appliances) by compressing the data before transmission thereby increasing the performance of a storage system.

As described below, the exemplary compression device may include an adapter coupled to a controller of a disk based or hard drive storage system. In one example, the compression device is integral with the controller, e.g., on the controller motherboard, for a disk or hard drive based storage system. Alternatively, the compression device may include a separate device or card that may provide a host interface and compression functions such that an off the shelf motherboard may be used. The compression device may further include data protection techniques such as Error Correction Codes (ECC), Cyclic Redundancy Codes (CRC), encryption, and the like.

Additionally, various applications including an exemplary compression device may include the following features alone or in combination. The compression device may provide for Fibre channel, Ethernet, internet small computer system interface (iSCSI), and other host bus (box to box) interfaces; hardware data compression, ECC, CRC, and data encryption for additional data protection; high speed dual ported memory and bridge capabilities between private high-speed local bus and main controller high-speed local bus; enhanced emulation functions that include storage device emulation, library emulation and visualization, controller-to-controller coherency, and cache backup for fail-over; I/O acceleration/performance that scales with the number of adapters in the controller; and for additional host interfaces via a mezzanine card.

FIG. 1 illustrates a block diagram of an exemplary information infrastructure 10 with one or more host computers 20 in communication with one or more primary storage units 40 and emulated tape system 50 through storage network 30. Although exemplary information infrastructure 10 is depicted as having four host computers 20, two primary storage units 40, and one emulated tape system 50 it should be recognized that exemplary information infrastructure 10 can include any number of host computers 20, any number of storage units 40, and any number of emulated tape systems 50. Additionally, it should be recognized that exemplary information infrastructure 10 can include fewer or additional components than those depicted in FIG. 1.

Host computers 20, primary storage locations 40, and emulated tape systems 50 can be connected directly such as using parallel small computer system interface (SCSI), integrated device electronics (IDE), and the like. Alternatively or additionally, host computers 20, storage units 40, and emulated tape systems 50 can be connected through a network topology such as fiber channel, Ethernet, and the like. If multiple storage units 40 are used, they may be daisy-chained together to increase capacity.

Host computers 20 may include various types of computers and computer systems such as personal computers, personal digital assistants, web-enabled appliances, cell phones, and the like, or any combination thereof. A host computer 20 may also be a server. Moreover, when exemplary information infrastructure 10 includes multiple servers, the servers may communicate through a client network. The servers may include various types of servers such as those based on the Unix, Linux, or Microsoft Windows operating systems, and the like, or a combination thereof. The client network may include any type of network such as the Internet, a corporate intranet, a wide area network, a local area network, a wireless network, and the like, or any combination thereof.

Primary storage unit 40 may be arranged in a number of different types of configurations such as a storage array network (SAN), network attached storage (NAS), direct attached storage, and the like. In other examples, the storage network 30 may reside in the chassis or cabinet of servers, stand alone storage devices, and the like, or a combination thereof.

Emulated tape systems 50 may include various types of devices capable of storing data such as rack mount servers connected to low cost disk arrays or custom integrated hardware systems and the like. In one exemplary embodiment, an emulated tape system 50 may include a plurality of hard drives or disks configured to emulate a storage tape drive system. For a more detailed description of an exemplary storage unit configured to emulate a storage tape drive system, see U.S. patent application Ser. No. 10/072,437 entitled EMULATED BACKUP TAPE DRIVE USING DATA COMPRESSION, filed on Feb. 5, 2002, and U.S. patent application Ser. No. 10/072,527 entitled STORAGE SYSTEM UTILIZING AN ACTIVE SUBSET OF DRIVES DURING DATA STORAGE AND RETRIEVAL OPERATIONS, filed on Feb. 5, 2002, both of which are incorporated herein by reference in their entirety as if fully set forth herein.

Figure 2:
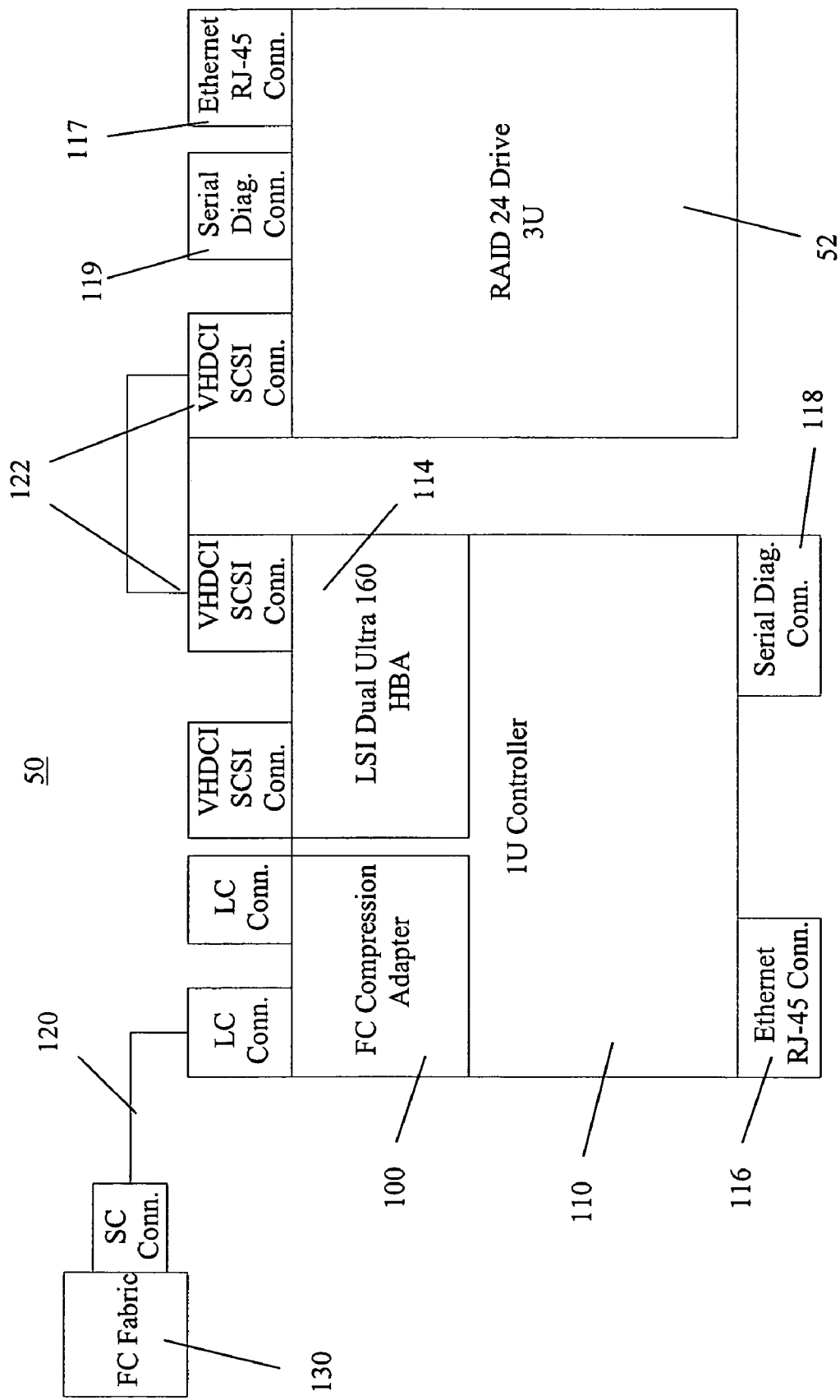
FIG. 2 illustrates a schematic diagram of a basic storage system interconnect structure including an exemplary fibre channel compression device.

FIG. 2 illustrates a block diagram of an emulated tape system 50 including a controller 110 and a relatively low cost disk array 52, for example. If multiple low cost disk array units 52 are used, they may also be daisy-chained together to increase capacity. In one example, controller 110 receives a stream of data from a host computer or the like to store data on storage unit 52, and retrieves data from storage unit 52 to send to a host computer or the like. As will be described below, in one example, the stream of data from the host computer is compressed using a compression device 100. Additionally, as will be described below, in one example, controller 110 emulates a storage tape device by receiving, compressing, and outputting sequential streams of data similar to that of a storage tape device.

In the exemplary embodiment depicted in FIG. 2, storage unit 52 is a RAID 24 Drive 3U. However, as noted above, storage unit 52 may include any suitable storage device such as an Advanced Technology Attachment (ATA) based RAID Array, Serial ATA (SATA) based RAID Array, Just a Bunch of Disks (JBOD) storage array, and the like.

Additionally, in the exemplary system depicted in FIG. 2, controller 110 communicates with storage network 30 through a hardware bus adapter (HBA) 114 and SCSI connection 122 or the like. Controller 110 is also coupled to a fibre cable (FC) fabric 130 or other network through connection 120. Various other connections are possible and contemplated.

It should be recognized that controller 110 and storage unit 52 may include various additional components such as connectors and ports. For example, connectors such as Ethernet connectors 116, 117 and serial connectors 118, 119 may be included. Additionally, it should be recognized that controller 110 and storage unit 52 may include fewer components than those depicted in FIG. 2.

Figure 3:
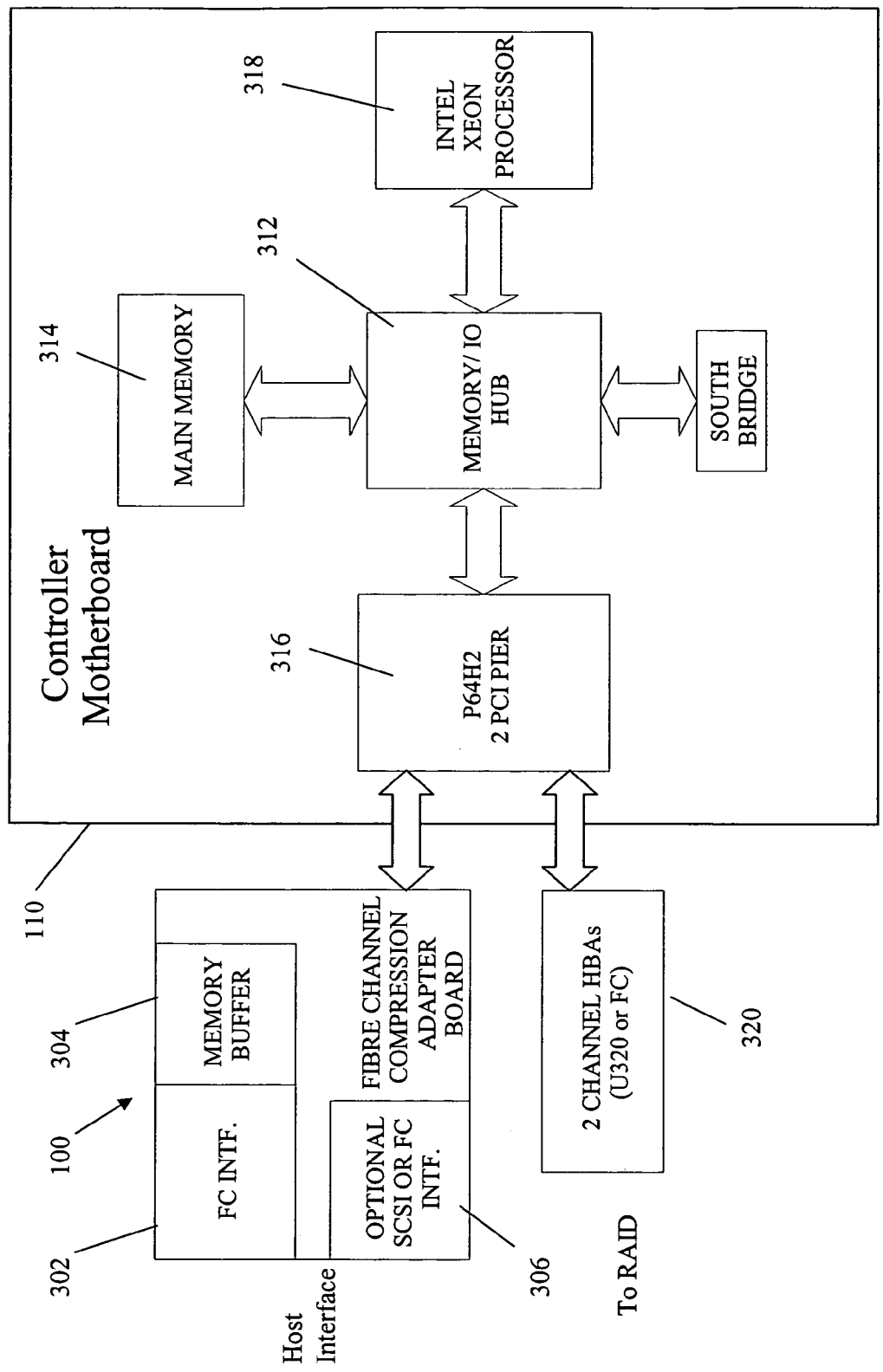
FIG. 3 illustrates a schematic diagram of a storage system controller using an exemplary fibre channel compression device.

In the exemplary system depicted in FIG. 2, compression device 100 may be coupled with an "off the shelf" controller 110 as an adapter to the controller 110 such as a SuperMicro X5DL8-GG Motherboard, Intel® SE7500WV2 and SE7501WV2 Westville II Server Boards, and the like, or be included on controller 100, e.g., as part of the controller 110 motherboard. It should also be recognized that compression device 100 may be "off-board," meaning that compression device 100 is not located on the same board as controller 110. For example, FIG. 3 illustrates a block diagram of an exemplary compression device 100 that is located separately from controller 110. More particularly, compression device 100 is depicted as being located on a fiber channel compression adapter board and controller 110 is depicted as being located on a controller motherboard. Additionally, exemplary compression device 100 may be located in a host computer 20 (see FIG. 1).

In the exemplary embodiment depicted in FIG. 3, controller 110 includes a memory I/O Hub 312 in communication with a main memory 314, a Peripheral Component Interconnect (PCI) 316, and a processor 318. In the present exemplary embodiment, PCI 316 is depicted as being a P64H2 2 PCI PIER. Additionally, processor 318 is depicted as being an Intel Xeon processor. It should be recognized, however, that these particular elements are illustrative only and various types of PCIs and processors can be used. Additionally, it should be recognized that controller 110 can include fewer or additional components than those depicted in FIG. 3.

When storing data, controller 110 processes incoming data sequences from a host computer and outputs the data through PCI 316 to a Host Bus Adapter (HBA) 320, which is connected to a storage device such as a RAID. It should be recognized that HBA 320 may be a component within or in communication with controller 110 depending on the particular application and design considerations. When retrieving data, controller 110 receives instructions from a host computer, accesses a storage device, retrieves the data from the storage device, and transmits the data to the host computer that requested the data.

In the exemplary embodiment depicted in FIG. 3, compression device 100 includes a fiber channel interface 302, a memory buffer 304, and an optional interface 306, which may include but is not limited to a SCSI, iSCSI, or FC interface. In this instance, compression device 100 communicates with controller 110 via PCI 316. It should be recognized that compression device 100 can include fewer or additional components than those depicted in FIG. 3.

In one exemplary method of storing data, compression device 100 compresses data received by controller 110 from the host computer before storing the data in a storage unit. When retrieving data, compression device 100 decompresses the previously compressed data retrieved from a storage unit by controller 110 before transmitting the decompressed data to a host computer.

Figure 4:
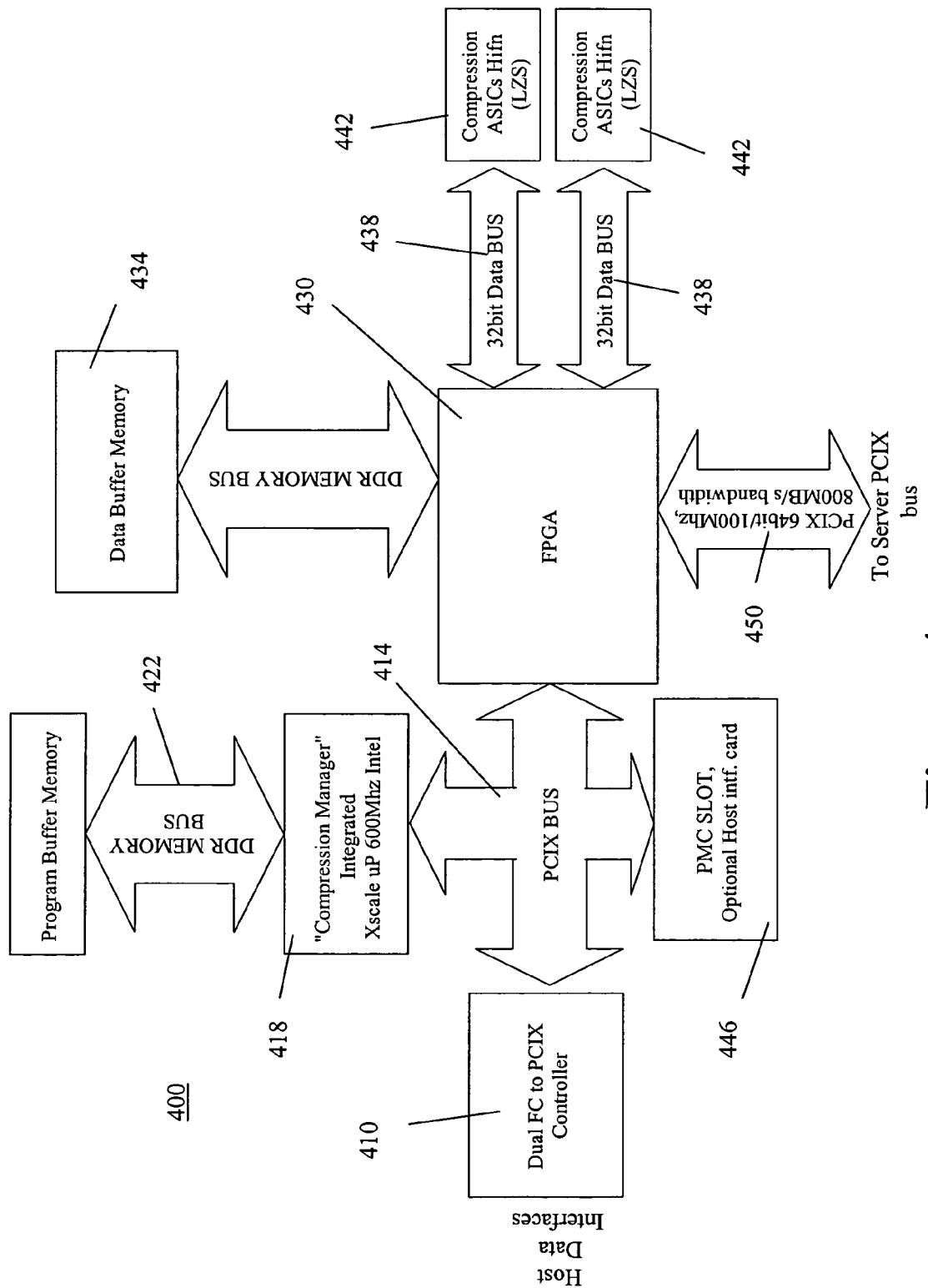
FIG. 4 illustrates a block diagram of an exemplary fibre channel compression apparatus and method.

FIG. 4 illustrates a block diagram of an exemplary compression device 400 in greater detail. FIG. 4 includes specific hardware and operating aspects as an illustrative example and it should be recognized that various hardware elements may be included or omitted. The present exemplary compression device 400 includes a host data interface controller 410, PCI extended (PCI-X) Bus 414, compression manager 418, memory bus 422, field programmable gate array (FPGA) 430, data buffer memory 434, data bus 438, compression hardware 442, PMC slot 446, and PCI-X bus to the server 450. Again, it should be recognized by those of ordinary skill in the art that compression device 400 may include fewer or additional components than those depicted in FIG. 4.

As described above, during a data storing process, data from a host computer enters through host data interface controller 410 to be stored on a storage unit. The present exemplary controller 410 may include a dual fibre channel (FC) to PCIX controller. Controller 410 may include any suitable chip, such as a dual fibre channel to PCI-X bridge IC for active/active fail-over manufactured by Qlogic or the like. A dual FC interface is generally desirable to connect to a SAN or the like. Further, a dual interface may allow for active/active failover, throughput, single IC implementation, and generally conserves board space. Controller 410 may route data to data buffer memory 434 or compression manager 418 depending on address.

The present exemplary compression device 400 includes a separate local bus that provides data transfer between controller 410 and high-speed dual ported memory. The separate local bus allows the system to isolate data transfers from the main controller local bus thereby improving performance of the local memory.

In the present exemplary embodiment, a stream of data, which is characteristic of data in applications emulating sequential access storage devices such as tape drives, can be compressed using parallel compression devices 442. More particularly, a stream of data can be divided into multiple data portions/blocks, and multiple compression devices 442 compress the data portions/blocks of the data stream in parallel, such as in a ping-pong fashion.

However, the resulting compressed data stream of data portions/blocks may no longer reside in contiguous physical memory due to the unpredictable efficiency of compression for an arbitrary portion of data. For example, one data block/portion may compress more or less than another data portion/block. Thus, in the present exemplary embodiment, the data portions/blocks of the data stream are indexed, for example using a scatter/gather list, based on their original sequence before being compressed and stored in a storage unit. During a retrieve process, the compressed data can then be retrieved from a storage unit and reassembled into a logically contiguous entity using the index (e.g., the scatter/gather list). It should be noted that the use of compression may also serve as an integrity check of the data. For example, there is a high probability of detecting an error if the data has been corrupted when the compressed data does not decompress to its original size.

During the data storing process, data protection functions may be performed on the data. Exemplary data protection functions may include data compression, Error Correction Codes (ECCs), Cyclic Redundancy Checks (CRCs), data encryption, and the like, or a combination thereof. In the present exemplary embodiment, an ECC may include a Reed-Solomon encoder/decoder technique. An exemplary CRC may include a 32 bit CRC with polynomial: $X^{32}+X^{26}+X^{23}+X^{22}+X^{16}+X^{12}+X^{11}+X^{10}+X^{8}+X^{7}+X^{5}+X^{4}+X^{2}+X+1$. It should be recognized by those skilled in the art that other ECC and CRC techniques may be implemented and are contemplated. Various data encryption techniques may also be employed to protect the data as will be appreciated by those skilled in the art.

In the present exemplary embodiment, data protection functions are performed using reconfigurable hardware, such as FPGA 430. In addition to data protection functions, FPGA 430 may be programmed to perform various additional functions such as those of a dual ported memory controller, separate local bus to memory bridge, separate local bus to main controller local bus bridge, main controller local bus to dual ported memory bridge, private local bus arbiter, and the like. One advantage of using a FPGA is that the FPGA can be reconfigured/reprogrammed in the field, e.g., enhancements may be made as desired. FPGA may also be known or referred to in the art as PAL, PLA, FPLA, EPLD, CPLD, EEPLD, and LCA. However, it should be recognized that a non-programmable logic device, such as an ASIC, may be used depending on the application.

Additionally, in the present exemplary embodiment, the parallel data compression function may be specifically performed using a dedicated compression hardware device. More particularly, in the exemplary embodiment depicted in FIG. 4, the parallel data compression function described above is performed by dual 9620 compression chips manufactured by Hifn, Inc., capable of 160 MB/s throughput individually and 320 MB/s combined. It should be recognized, however, that other devices with different specifications may be used depending on the particular application and desired performance.

After data protection functions are performed, the processed data, which in the present exemplary compression device 400 has been compressed as data portions/blocks, is then transferred via Direct Memory Access (DMA) into either local dual ported memory or main controller memory to be stored in a storage unit. As described above, the storage unit may include a RAID (ATA or SATA), JBOD storage array, and the like.

In the present exemplary compression device 400, data transfer functions and data protection functions are managed and/or performed via a local microprocessor, compression manager 418. Compression manager 418 processes interrupts and accumulates a sequence of data from the host processor according to program buffer memory 422 and cues up compressors 442. Additionally, emulation functions and upper level management of single or multiple compression adapters may be performed via the controller processor residing on the motherboard (see, e.g., FIG. 3). Further, in one example a mezzanine card may be included for additional host interface capability and flexibility within the system.

Figure 5:
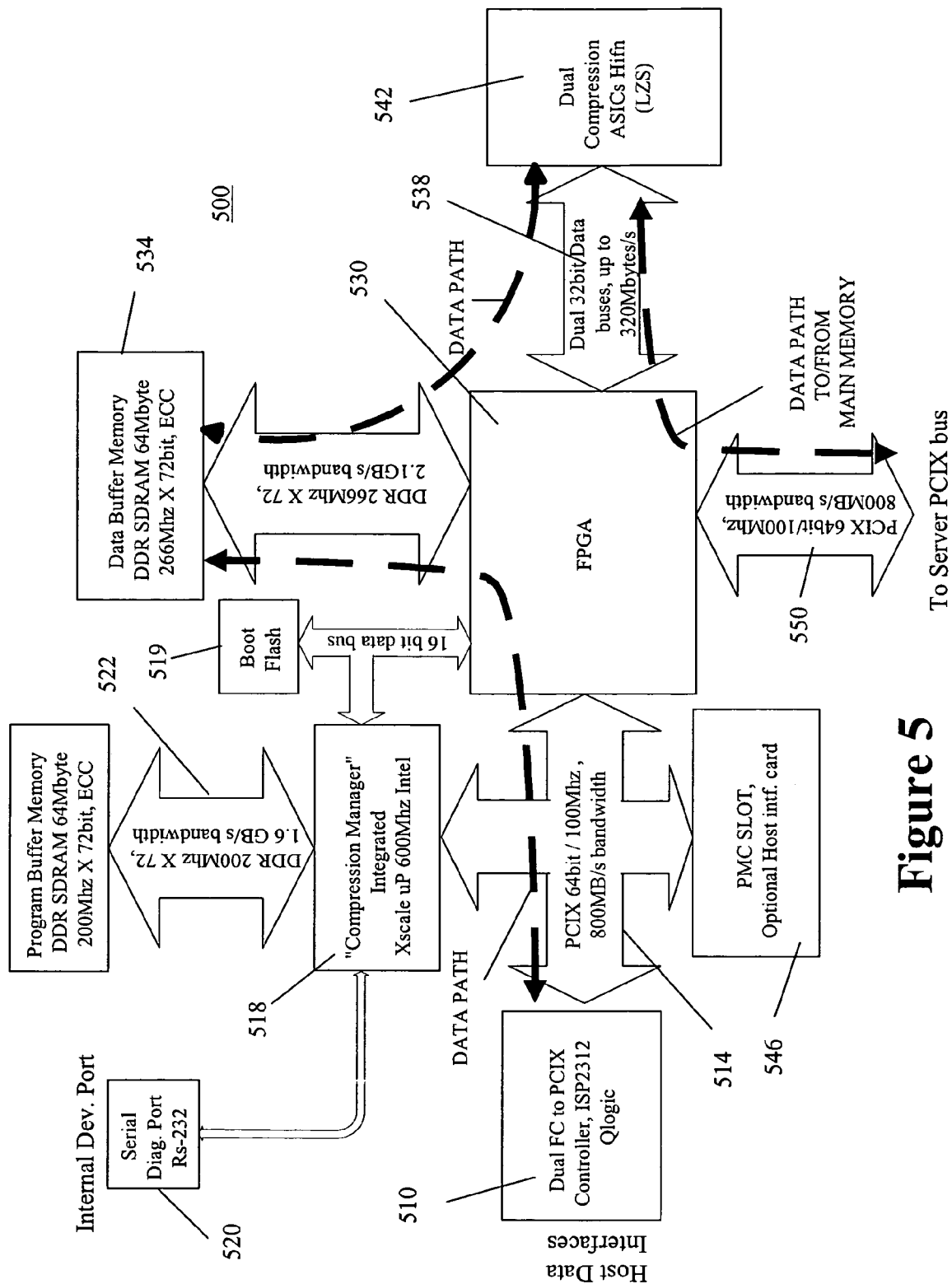
FIG. 5 illustrates a block diagram of an exemplary fibre channel compression apparatus and method.

FIG. 5 illustrates a block diagram of another exemplary fibre channel compression device 500 according to another embodiment. FIG. 5 includes specific hardware and operating aspects according to one example and is similar to FIG. 4. Accordingly, only differences will be discussed.

The present exemplary compression device 500 includes a dual FC to PCIX controller 510, PCI-X Bus 514, integrated microprocessor compression manager 518, boot flash 519, internal device port 520, DDR memory bus 522, FPGA 530, data buffer memory 534, data bus 538, compression hardware 542, PMC slot 546, and PCI-X bus to the server 550.

The bolded dotted arrows indicated an exemplary path of data to and from the host interface to the main memory in compression device 500. During a storing process, data from a host computer enters through controller 510 to be stored in a storage unit. The flow of data proceeds through separate local bus PCI-X Bus 514, controlled by compression manager 518 as described above, through FPGA 530 and into data buffer memory 534. From data buffer memory 534, the data proceeds to dual compression ASICs chips included in compression hardware 542. As described above, the data may be divided into multiple data portions/blocks and compressed in parallel. The data portions/blocks may be indexed and routed via DMA as a sequential series of compressed data into local dual ported memory or main controller memory to be stored in a storage unit(s).

During readout or a storage retrieval process, data from the storage unit is retrieved from the storage unit(s), decompressed, and reassembled into the original sequential stream of data using the index created when storing the data blocks. In this manner, compression device 500 may emulate a sequential access storage device such as magnetic storage tape devices and/or magnetic tape libraries.

The above detailed description is provided to illustrate exemplary embodiments and is not intended to be limiting. It will be apparent to those skilled in the art that numerous modification and variations within the scope of the present invention are possible. For example, various hardware implementations with similar functions will be recognized and are contemplated. Further, numerous other processes not explicitly described herein may be used within the scope of the exemplary methods and structures described as will be recognized by those skilled in the art.

The invention claimed is:

1. A storage sub-system for storing data emulating a storage tape device, comprising:
   a controller having a main memory, wherein the controller is coupled to a plurality of disk drives and configured to emulate a storage tape device, and
   a PCI (peripheral component interconnect) expansion card which connects between the controller and a host, wherein the PCI expansion card comprising:
       a data interface to receive a sequence of data from the host;
       a local memory buffer;
       an FPGA having a PCI interface, wherein the FPGA is coupled to the data interface, the local memory buffer, and two or more compression devices,
       wherein the sequence of data is transferred from the data interface to the local memory buffer through the FPGA, from the local memory buffer to the compression device, from the compression device to the main memory via the PCI interface of the FPGA, and from the main memory to the plurality of disk drives,
       wherein, the sequence of data received from the local memory buffer is divided into two or more blocks,
       wherein said two or more blocks are indexed using a scatter/gather list, compressed in parallel by said two or more compression devices, applied data protection functions including Cyclic Redundancy Checks in each block, and
       wherein said two or more block from the compression device are stored in the plurality of disk drives and the controller is configured to retrieve said two or more blocks from plurality of disk drives according to said scatter/gather list.

2. The storage system of claim 1, wherein the plurality of disk drives includes at least one of a ATA RAID, SATA RAID, and JBOD storage arrays.

3. The storage system of claim 1, wherein the PCI expansion card is included on a common board with the controller.

4. The storage system of claim 1, wherein the data interface includes a dual fibre channel interface.

5. The storage system of claim 1, wherein the PCI expansion card includes a separate local bus to communicate with the controller.

6. The storage system of claim 1, wherein said two or more compression devices comprise reconfigurable hardware to implement at least one of an error correction code, and data encryption on the data.

7. The storage system of claim 1, wherein the PCI expansion card device is configured to receive a mezzanine card.

8. The storage system of claim 1, wherein the PCI expansion card includes a PMC slot.

9. A method for storing data in a storage sub-system including a controller having a main memory, wherein the controller is coupled to a plurality of disk drives and configured to emulate a storage tape device, and a PCI (peripheral component interconnect) expansion card comprising a data interface, a local buffer, a FPGA coupling to the data interface, the local memory buffer and two or more compression devices, wherein the PCI expansion card connects between the controller and a host, comprising:
  receiving a stream of data by the data interface from the host;
  storing the stream of data into the local memory, wherein the stream of data is transferred from the data interface to the local memory buffer through the FPGA;
  transferring the received stream of data from the local memory buffer to the compression device;
  dividing the received stream of data into two or more blocks;
  indexing said two or more blocks using a scatter/gather list;
  compressing said two of the two or more blocks in parallel by said two or more compression devices, and
  applying data protection functions including Cyclic Redundancy Checks for each of said two or more blocks;
  transferring said two or more blocks from said two or more compression device to store in the main memory via the PCI interface of the FPGA, and from the main memory to store into the plurality of disk drives,
  wherein said controller is configured to retrieve said two or more blocks from the plurality of disk drives according to said scatter/gather list.

10. The method of claim 9, further including:
  decompressing said two or more blocks from the plurality of disk drives;
  reassembling said two or more blocks according to the scatter/gather list; and outputting said two or more blocks as a sequential stream of data.

11. The method of claim 9, wherein said two or more blocks are indexed according to an order in which the stream of data is received.

12. The method of claim 9, further including:
  decompressing said two or more blocks from the plurality of disk drives;
  outputting the decompressed data serially according to the scatter/gather list.

13. The method of claim 9, further including said receiving the stream of data through a dual fibre channel interface.

14. The method of claim 9, wherein said applying data protection functions including at least one of an error correction code and data encryption on the data.

15. The method of claim 14, wherein the at least one of an error correction code and data encryption is performed through hardware.

16. The method of claim 14, wherein the at least one of an error correction code and data encryption on the data is performed by reconfigurable hardware.

17. A method for data compression with emulated tape storage device, comprising:
  receiving a stream of data from a host by a data interface of a PCI (peripheral component interconnect) expansion card comprising the data interface, a local memory buffer, an FPGA coupling to the data interface, the local memory buffer and two or more compression devices, wherein the PCI expansion card connects between a controller of a plurality of disk drives and the host;
  storing the stream of data from the data interface into the local memory buffer through the FPGA;
  dividing the stream of data into two or more blocks;
  transferring said two or more blocks to said two or more compression devices;
  compressing the two or more blocks in parallel by said two or more compression devices;
  indexing said two or more blocks using a scatter/gather list;
  applying data protection functions including Cyclic Redundancy Checks for each of the two or more blocks;
  transferring said two or more blocks from said two or more compression devices to store in a main memory of the controller via the PCI interface of the FPGA, wherein the controller is configured to emulate a storage tape device;
  storing said two or more blocks from the main memory into the plurality of disk drives by the controller, wherein said controller is configured to retrieve said two or more blocks from the plurality of disk drives according to said scatter/gather list.

18. The method of claim 17, wherein said compressing the two or more blocks is compressed with a hardware compression device.

19. The method of claim 17, further including:
  decompressing said two or more blocks from the plurality of disk drives; and
  outputting the decompressed blocks serially according to the scatter/gather list.

20. The method of claim 17, wherein said applying data protection functions further including performing at least one of an error correction code and data encryption on the data, wherein the at least one of an error correction code and data encryption is performed by reconfigurable hardware.

* * * * *